April 5, 1960 H. W. WILLIAMS 2,931,338
PLASTIC CARTRIDGE FOR CONTAINING LIQUID INK
Original Filed Feb. 1, 1954
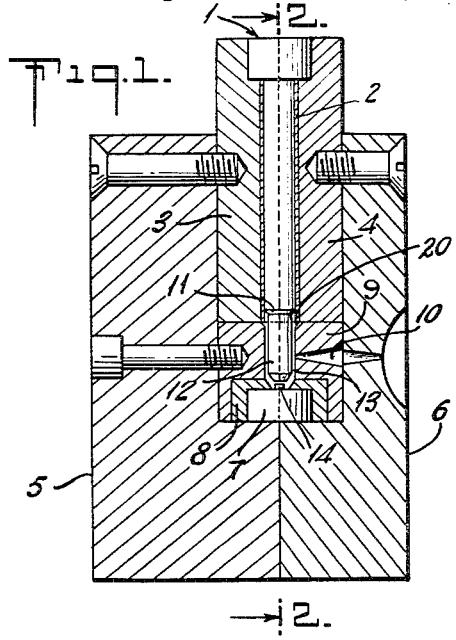
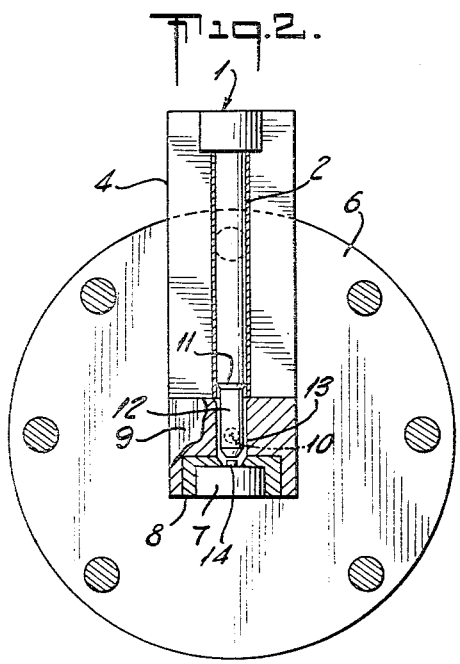
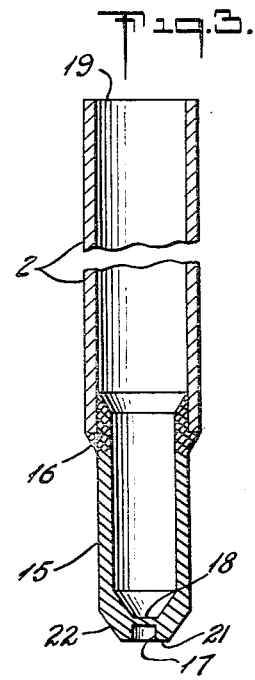
INVENTOR
HAROLD W. WILLIAMS
BY
Burgess Ryan & Hicks
ATTORNEYS

United States Patent Office 2,931,338
Patented Apr. 5, 1960

2,931,338

PLASTIC CARTRIDGE FOR CONTAINING LIQUID INK

Harold W. Williams, Pawling, N.Y., assignor, by mesne assignments, to Bic Pen Corporation, a corporation of New York Continuation of application Serial No. 407,471, February 1, 1954. This application August 7, 1958, Serial No. 753,752

3 Claims. (Cl. 120—45.4)

This invention relates to fluid containers of what has come to be known as the squeeze-bottle type, made of polyethylene, vinyl chloride or like flexible thermoplastic material. For most purposes, the polyethylene is preferred.

This is a continuation of my copending application Serial No. 407,471, filed February 1, 1954, now abandoned.

The objects of the invention is to provide a method of producing such containers at low cost and a method which lends itself to the production of thin-walled, more or less tubular containers, of any desired cross-section, free of flaws such as are typical of injection molding of articles of this type. The flaws refered to are the flow markings and belmishes exhibited by such articles when they are viewed against a strong light, these markings resulting from the cooling of the plastic in the mold before it reaches the remote end of the cavity. In the case of thin-walled containers of considerable length compared to their transverse dimension, these flaws are particularly pronounced and are a source of weakness and possible rupture.

A particular illustration of the problem is the manufacture of ink cartridges for fountain pens, the problem in this instance being accentuated by the need of providing a thin, diaphragm-like wall at one end of the container adapted to be pierced by an ink feed tube within the feed end of the pen barrel. Filled with ink, such cartridges are sold completely sealed, the arrangement being such that when the cartridge is inserted and the barrel screwed home, the cartridge diaphragm is automatically pierced by the feed tube and the pen ready for use. Normally, the injection molding of such a container would require an end gate or entrance of the mold but, of course, that is not feasible in the case of the ink cartridge due to the location of the diaphragm. Furthermore, it is desirable to have a flexible walled cartridge which, in an emergency, can be at least partially filled by squeezing the walls together, with the nib submerged in ink, necessitating a cartridge free of flow defects in the material. As will be recognized, the method of this invention is adaptable to the manufacture of various containers where the same or similar problems are encountered but, for convenience, it will be illustrated and described with reference to a fountain pen ink cartridge.

The method and resulting product will be readily understood from the accompanying drawings, in which:

Fig. 1 is a cross-section of a mold suitable for carrying out the method of the invention;

Fig. 2 is a section on the line 2—2 of Fig. 1; and

Fig. 3 is a longitudinal section of a container produced by the illustrated mold.

It may be noted here that the present invention is concerned with the manufacture of the container or cartridge to the stage where it is ready for filling, the latter operation and the final sealing forming no part of the invention.

According to the present invention, the body portion of the container consists of pre-formed, tubular, plastic stock of the desired cross-section and wall thickness. This stock is not molded but is extruded and hence its composition is homogeneous and free of mold defects, so that, even with thin walls, it is adequately strong for the purpose. The tube stock is extruded in long lengths and then severed into suitable body-portion lengths. For ink cartridges, polyethylene plastic is preferred and of a wall thickness of the order 20–25 thousandths of an inch. For appropriate ink capacity, the severed tubes may be of a length of, say, 2 inches.

A severed tube length is next mounted on a supporting core member designed to fit snugly the interior of the tube and the core member and tube are then clamped under pressure between the halves of a suitable mold having a cavity shaped to form a closure in the form of a nose portion for one end of the tube. The arrangement is such that the end of the tube to be closed by the nose portion is exposed to and forms a closure for the mold cavity so that, when the hot plastic is injected into the cavity, the nose portion is coincidently formed and welded to the protruding end of the tubular body portion. It has been found that the normal heat of the injected material is sufficient to soften the tube end and effectively bond the nose and body portions.

The nose portion of the container can thus be relatively short and, as will be recognized, it is entirely feasible to inject the material into the side of the mold (that is, transversely of the container axis) thereby making it possible to incorporate in the nose the thin end wall or diaphragm, when that is required.

Exemplifying the foregoing, the accompanying drawings show a core member 1 which constitutes the support for the per-formed, extruded tube length 2. The core member and tube are held between identical clamp blocks 3, 4 which are recessed into and secured to the respective mold halves 5, 6.

Also recessed into the mold halves are the cavity-forming elements 7, 8, 9, the last-mentioned incorporating the gate 10 through which the material is injected into the cavity.

As will be noted, the core member 1 is shouldered at 11 and formed with a reduced end portion 12 which forms the true core for the nose portion cavity, the side wall of which is defined by the bore 13 in element 9 and the frustroconical end of which is formed by the aperture in element 8. The upstanding projection 14 of element 7 closely approaches the nose of core members 1, 12.

The length of the tube 2 and its relation to the shoulder 11 are such that its end projects into and forms a closure for the nose portion cavity. It will be noted that the inside diameter of the nose cavity is less than that of the tube and that, in effect, the cavity extends slightly within the tube. Also, while the outside diameter of the nose cavity is intermediate the outside and inside diameters of the tube, the entrance to bore 13 is countersunk at 20 sufficiently to expand the cavity to the outside diameter of the tube. Thus, both the end surface of the tube and a short length of its inner surface are exposed to the injected material. By this means, effective bonding or welding is ensured.

The use of polyethylene or like material for the extruded tube, permits the latter to be so tightly clamped and compressed onto its supporting core member as to prevent the injection pressure from forcing the molding material up into or around the tube, that is, beyond the weld area. Effective clamping may be ensured by making the bore in the clamp blocks 3, 4 of slightly smaller diameter than that of the outside of tube 2. For example, if the O.D. of the tube is, say .275", the diameter of the bore may be .270".

The resulting cartridge is illustrated in Fig. 3, the extruded tube or body portion 2 having the nose portion 15 welded to it in the molding operation. The weld area is indicated at 16 by double cross-hatching. As will be understood, the axial bore 17 and the reduced thickness diaphragm wall 18 in the nose are formed by the projection 14 of element 7. The cartridge is filled through its open end 19 which is then sealed. Thus formed, the body and nose portions constitute a strongly bonded unit and the body portion, being extruded and hence free of mold defects, has no tendency to split when squeezed. The nose terminates in a flat end face 21 surrounding the bore 17 and surrounded by a conical tapered peripheral surface 22.

In the light of the foregoing exemplification of the principles of the invention, the following is claimed:

1. In a cartridge for containing liquid ink and adapted to be inserted within a fountain pen barrel when in use, an elongated axially stiff tubular cylinder body of flexible thermoplastic material such as polyethylene open at one end for filling and closed at the other end by a nose portion adapted to fit into an ink feed socket within the pen, said nose portion consisting of a short cylinder formed of said material of smaller external diameter than the body and an axially facing external shoulder being provided on said cartridge at the junction of said body and nose portions, said nose portion having a centrally disposed small bore opening to an annular axially facing end surface, and an integral thin diaphragm of said material extending across the bottom of said bore axially inwardly of said end surface, said bore being of appreciably smaller diameter than the internal diameter of said nose portion cylinder and being separated therefrom by said diaphragm, and said nose portion having a frusto-conical external peripheral surface surrounding said bore and tapering to said axially facing end surface.

2. In a cartridge for containing liquid ink and adapted to be inserted within a fountain pen barrel when in use, an elongated axially stiff tubular cylinder body of flexible thermoplastic material such as polyethylene open at one end for filling and closed at the other end by a nose portion adapted to fit into an ink feed socket within the pen, said nose portion consisting of a short cylinder of smaller diameter than the body and formed of said material with one end disposed within said other end of said body and there heat fused to said body so that an axially facing external shoulder is provided on said cartridge, said nose portion having a centrally disposed small bore opening to an annular axially facing end surface, and an integral thin diaphragm of said material extending across the bottom of said bore axially inwardly of said end surface, said bore being of appreciably smaller diameter than the internal diameter of said nose portion cylinder and being separated therefrom by said diaphragm, and said nose portion having a frusto-conical external peripheral surface surrounding said bore and tapering to said axially facing end surface.

3. In the cartridge defined in claim 2, said elongated tubular cylinder body being an extruded uniformly thin walled tube laterally free of junction regions so as to be ink tight.

References Cited in the file of this patent

UNITED STATES PATENTS

| | | |
|---|---|---|
| 1,658,940 | Pollock | Feb. 14, 1928 |
| 1,671,125 | Pollock | May 29, 1928 |
| 2,173,627 | Jecusco | Sept. 19, 1939 |
| 2,484,965 | Slaughter | Oct. 18, 1949 |
| 2,620,773 | Tefft | Dec. 9, 1952 |
| 2,629,362 | Muench | Feb. 24, 1953 |
| 2,671,577 | Remington et al. | Mar. 9, 1954 |
| 2,673,374 | Strahm | Mar. 30, 1954 |

FOREIGN PATENTS

| | | |
|---|---|---|
| 273,834 | Switzerland | July 2, 1951 |
| 1,032,362 | France | Mar. 25, 1953 |